Figure 1:
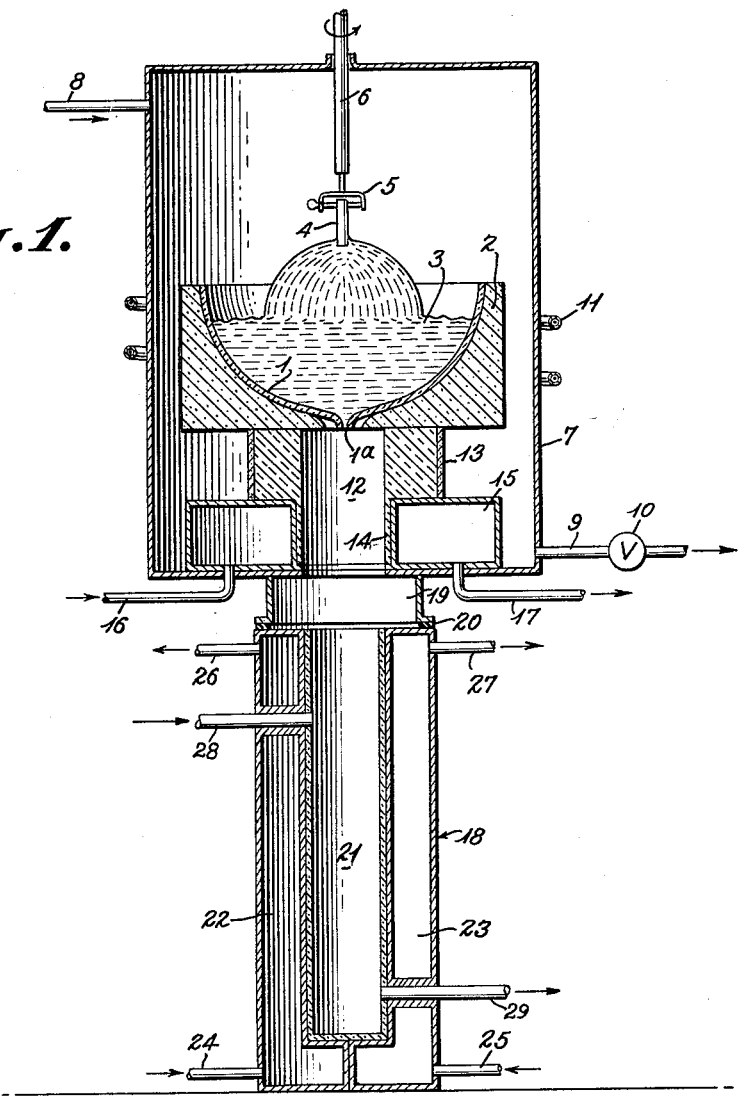

June 11, 1963 W. R. RUNYAN ETAL 3,093,456
METHOD FOR RECOVERY AND REUSE OF QUARTZ CONTAINERS
Filed Sept. 2, 1958 2 Sheets-Sheet 1

INVENTORS
WALTER R. RUNYAN,
JOHN W. ROSS AND
JAMES L. FISCHER
BY Stevens, Davis, Miller & Mosher
ATTORNEYS

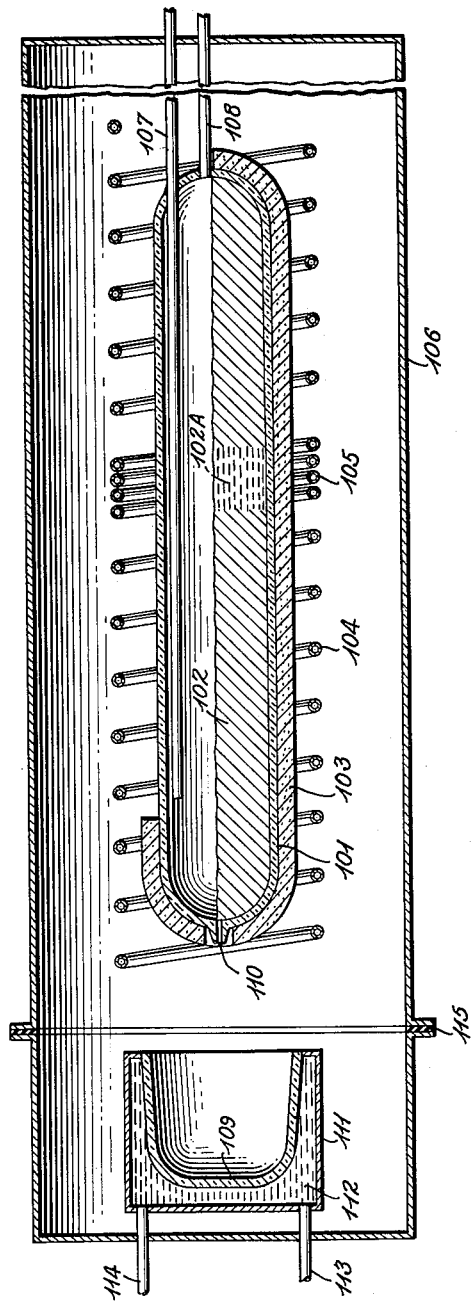

3,093,456
METHOD FOR RECOVERY AND REUSE OF QUARTZ CONTAINERS
Walter R. Runyan, Dallas, John W. Ross, Richardson, and James L. Fischer, Dallas, Tex., assignors to Texas Instruments Incorporated, Dallas, Tex., a corporation of Delaware
Filed Sept. 2, 1958, Ser. No. 758,379
2 Claims. (Cl. 23—301)

This invention relates to the production and purification of silicon crystals and more particularly to a method and apparatus for producing such crystals which allows for the recovery and reuse of the quartz containers normally used therein.

Crystals of various chemical elements and compounds such as germanium, selenium, silicon and the like are used in semiconductor devices which are assuming a role of increasing importance in the electronic industry. Various methods are in use today for producing and refining semiconductive materials having the essential properties of high purity and homogeneity. However, in the refining of such materials, difficulties may be present when working with one particular metal or material which may not occur when working with another. For instance, when working with germanium, which has a relatively low melting temperature of approximately 980° C., the material can be handled easily in graphite containers or crucibles and does not appear to attack the graphite container appreciably during the refining processes. Also, germanium can be melted and solidified in a graphite crucible without destroying the crucible upon subsequent cooling. In addition, graphite is a very common material and is easily machined. On the other hand, silicon has a much higher melting point, about 1420 to 1440° C. and graphite is unsuitable as a container to hold the material during the refining processes. Experimentation has shown that quartz is the only acceptable crucible material at the present time, and at these high temperatures a reaction occurs between the quartz and the silicon. If any portion of the molten silicon is then solidified in the quartz crucible, bonding of the silicon to the quartz occurs and the crucible will shatter or crack upon cooling due to the difference in thermal expansion and contraction of the materials.

During the melting of a silicon mass within a quartz crucible or container, there usually results a small amount of leaching of impurities from the quartz container such as boron and it is readily apparent that if the quartz container or crucible could be recovered and reused after the initial operation, any subsequent operation with the same quartz container would occur with a substantial reduction in the amount of leaching of such impurities from the container. It is believed that after a number of repeated reuses of the same quartz crucible, leaching of the impurities such as boron from the container by the silicon mass during the refining operation would be reduced.

In addition to producing a silicon mass containing a minimum amount of impurities, it is also advantageous to produce as homogeneous a product as possible. The term "homogeneous" as used hereinafter refers to a mass of silicon material wherein the impurities within the mass are evenly distributed throughout the mass and there is no concentration of impurities at any point therein. To insure that the ultimate product will be homogeneous, it is desirous to melt the entire charge so as to obtain homogeneity and then to form the end product wherein such homogeneity is retained. Since the charge when fully melted within the quartz crucible is at this time homogeneous, it is apparent that a homogeneous product may necessarily result if the charge can be completely transported from the quartz crucible and solidified in a minimum period of time.

Even where a homogeneous mass is produced by completely melting silicon within a suitable quartz crucible, this homogeneity is defeated during cooling operations wherein a segregation action occurs during the freezing of the silicon mass after it is transferred from the quartz crucible. This is because one portion of the silicon end product will have solidified prior to another portion. In this case, there is a tendency for the impurities to remain in the liquid portion of the silicon so that a greater amount of impurities will be found in the portion of the mass which last solidifies. If the silicon mass could be frozen immediately upon transfer from the crucible while in a homogeneous molten condition, substantially no segregation would occur and the resultant end product would be completely homogeneous in like manner to the molten mass within the crucible prior to transfer.

An important use of the present invention is in the field of producing silicon doping pellets. Doping pellets are produced by the instantaneous freezing of individual droplets of silicon material as they are transported from the quartz crucible in which the main mass of silicon has been previously melted along with a doping element in small amounts to produce a silicon alloy having the desired resistivity characteristics. The present invention allows the complete melting of the silicon mass within the quartz crucible to effect a homogeneity of the mass within the crucible, in combination with improved means for transferring the mass from within the crucible and subsequent quick-freezing of the individual globules of molten material being transferred thereby producing doping pellets which have the desired homogeneity. To vary the characteristics of the resultant pellets, it would only be necessary to vary the amount of doping element added to the mass within the crucible prior to or during the melting operation.

In addition to the formation of homogeneous doping pellets, the present invention is particularly adaptable to the well known "crystal pulling" process in which a seed is dipped into a molten mass of silicon and the surface of solidification of the crystal is gradually advanced from the seed to the molten substance to produce a single crystal of high purity silicon. This method of forming a single crystal of silicon has been found to be advantageous and is used extensively for producing such crystals. However, while the single crystals produced by this method have been quite satisfactory and contain a minimum amount of impurities, there has always been left in the bottom of the crucible or container containing the molten silicon material a residue comprising a small portion of the molten silicon mass. As noted previously, this residue of silicon upon cooling within the quartz container or crucible would result in a bond being formed between the two causing cracking or shattering and hence destruction of the quartz crucible.

Since it is well known that a segregation action occurs during the conventional crystal pulling operation, as the crystal is formed the impurities will tend to remain within the molten solution and the portion of the crystal in the vicinity of the seed will contain a minimum amount of impurities. The present invention makes use of this phenomenon to achieve purification conveniently by repeated crystal growing operations and residual melt ejection through the use of a novel quartz liner or container.

The present invention is also particularly applicable to zone refining of silicon to produce a silicon mass which is both homogeneous and of high purity. In the conventional zone refining of semiconductive materials including silicon, a mass of the material is positioned within a suitable container and an induction coil or other heating means is positioned to surround only a portion of the material to produce localized heating and a resultant melting of only this portion. As noted previously, there is a tendency for the impurities to segregate and be concentrated in the last region to freeze. As a result of this phenomenon, the impurities of the semiconductive material are progressively advanced from one end of the mass toward the other to effect a refining of the semiconductor. In this instance, the present invention is utilized after zone refining has been completed and is employed to remove only a portion of the semiconductive mass within the crucible so that the individual portions as they are removed from the crucible may be transferred individually to produce a series of end products having varying purity contents.

In view of the foregoing, the objects of this invention may be stated as follows: To provide an improved method for producing a completely homogeneous silicon mass; to provide an improved method for producing a silicon mass having a minimum amount of impurities; to provide an improved means for transferring molten silicon from a quartz container to a cooled container which will insure that the resultant product is homogeneous; to provide a method of producing densified and homogeneous silicon products wherein the cooling of the molten silicon takes place so quickly that little segregation of impurities takes place; to provide a method for producing and refining silicon materials in which the quartz containers normally utilized in this process may be recovered and reused in subsequent operations; to provide a method for producing and refining silicon crystals which eliminates waste of any portion of the silicon material which is melted within the quartz container during such operations; to provide a novel method of recovery and reuse of quartz containers in which the residue formed during the crystal pulling operation may be easily removed from the bottom of the container to allow recovery and reuse of the container; to provide an improved method of refining silicon to produce a final end product which may be in the form of a densified, homogeneous, high-purity silicon rod, or in the form of improved, homogeneous, high-purity pellets; to provide an improved method involving repeated crystal growing operations and residual melt ejection to produce an end product of low impurity content; to provide an improved zone refining process which allows a portion of the silicon mass which is refined to be removed from the quartz container without in any way affecting the removal of the remaining portion of the silicon mass; to provide an improved zone refining process for silicon wherein the silicon end product contains a minimum of impurities and the homogenization of the silicon is greatly enhanced; and to provide an imroved zone refining process wherein the silicon product resulting from the zone refining process appears in either the form of a densified homogeneous rod or in the form of high-purity pellets.

Further objects and advantages of this invention will become apparent as the following description proceeds, and the features of novelty which characterize this invention will be pointed out with particularity in the claims annexed to and forming a part of the specification.

In accordance with one form of this invention there is provided a quartz crucible or container in which the silicon is melted prior to the formation of the end product. There is formed in the bottom of the crucible or container a small aperture opening which is of a size sufficiently small to prevent the escape of molten material under normal gravitation force. After the material is completely melted and homogeneous, the molten mass is removed by increasing the pressure above the upper surface of the material so as to force the material through the aperture. The crucible or container is then free of any residue silicon and may be readily reused in subsequent operations.

In another form of this invention, the quartz crucible is associated with an apparatus particularly adaptable for a "crystal pulling" operation. After the single crystal of semi-conductive material is formed by such operation, the molten silicon residue remaining in the bottom of the quartz crystal is removed by creating a pressure differential across the aperture and the upper surface of the residue so as to force the residue through the aperture. The crucible or container is then free of any residue and may be readily reused in subsequent semiconductor "crystal pulling" operations.

In still another form of the invention, there is provided a quartz crucible or container in which the silicon is melted in a conventional zone refining process wherein only a portion of the silicon mass is melted and the molten zone is advanced from one end of the mass to the other to effect a progressive refining of the semi-conductive mass. The crucible or container and its associated apparatus is then rotated 90° from a horizontal to a vertical position wherein an aperture formed within one end of the crucible is directed downward and the mass of semiconductive material immediately adjacent the aperture is melted. A pressure difference is created across this aperture to effect removal of only the melted portion of the semiconductive mass through the aperture. The pressure differential is then relieved and the next adjacent portion of the semiconductive mass is melted and forced through the aperture in a like manner, being removed in the form of pellet or a densified rod. Upon complete removal of the semiconductive mass from within the quartz crucible, the quartz crucible may be readily reused in subsequent operations.

For a better understanding of this invention reference may be had to the following detailed description taken in connection with the accompanying drawings wherein:

FIG. 1 is a front sectional view of an apparatus to be used in a crystal pulling operation embodying one form of this invention; and FIG. 2 is a front sectional view of a zone refining apparatus which illustrates another embodiment of this invention.

Referring now to FIG. 1, there is shown a quartz container or crucible 1 which is positioned within a support means 2 composed of graphite or any other suitable material, the quartz crucible being adapted to receive an ingot of silicon 3 which is shown in molten state. A seed 4 of the same material is placed in chuck 5 which is positioned above the molten mass of semiconductor material. Shaft or spindle 6 is attached to the chuck 5 and is moved axially with respect to the molten mass to effect the crystal pulling operation. The shaft 6 is also rotated by means not shown during this operation to produce a single crystal of silicon. While the single crystal of silicon is formed by the conventional "crystal pulling" operation, the present invention is by no means limited in its use to such an operation. The crystal pulling operation occurs within a closed container 7, the container 7 is flushed by passing a gas therethrough. The gas, which may be conventional inert gas, wet-hydrogen, wet inert gas or any other suitable fluid, enters through conduit 8 and is removed through conduit 9. There is provided in the outlet conduit 9 a suitable valve 10 for allowing the build up of gas pressure within the chamber 7, the purpose of which will be discussed later in detail. A heating coil 11 is positioned adjacent the quartz container or crucible and outside the sealed container 7. A high-frequency generator, not shown, is utilized to pass a current through the induction coil 11 in order to melt the charge in quartz container 1. After the ingot is completely molten, the shaft or spindle 6 is lowered until the seed 4 touches the surface of the melt. The spindle 6 is then moved upward away from the surface of the melt, while being rotated, to produce a single crystal in a manner well known in the art.

One aspect of the present invention is the novel method of removing the residue or remaining portion of the molten silicon after the crystal pulling operation has terminated. In this regard, there is provided an aperture 1a in the bottom of the quartz container 1 for allowing the residue to be removed therethrough. During the "crystal pulling" process, the silicon is held in the crucible 1 by surface tension, the diameter of the aperture or opening 1a being sufficiently small to prevent the escape of the molten silicon under the influence of gravity. A diameter in the order of $\frac{1}{16}$ to $\frac{3}{32}$ inch has been found to produce satisfactory results with the conventional "crystal pulling" apparatus.

Since the residue is to be forced through the aperture in the bottom of the quartz crucible, the lower portion of the conventional crystal-producing apparatus has been modified to effect its removal. In order to accomplish this, there is provided a quartz cylinder 12 which is positioned below the graphite support means 2 and the quartz liner 1, the quartz cylinder being coaxial with the aperture 1a. A second cylinder of graphite or high-temperature ceramic material 13 is positioned adjacent the outer wall of quartz cylinder 12. A lower portion 14 of quartz cylinder 12 terminates at the bottom wall of the sealed container 7 so as to seal the space formed within the quartz container from the gas-filled interior of the sealed container 7, except for aperture 1a which will allow the gas to penetrate cylinder 12 after the residue within the crucible is exhausted to this chamber. In order to cool the molten residue as it is exhausted from aperture 1a, a hollow base member 15 is positioned between the bottom of the sealed container 7 and the quartz cylinder 12 and graphite cylinder 13. The hollow base member is annular and surrounds the lower portion 14 of cylinder 12, which may be of stainless steel or the like. A suitable coolant such as water is introduced through inlet conduit 15 and is exhausted through outlet conduit 17 to effect cooling of the liquid residue as it falls from aperture 1a through the hollow quartz cylinder 12. The hollow base member also acts as a support means for the two cylinders 12 and 13 which, in turn, support the quartz crucible or container 1 and its associated support means 2.

In order to collect the residue as it escapes through aperture or opening 1a, there is provided a generally cylindrical collector assembly 18 which is positioned beneath the sealed container 7. To allow the container 18 to be removed after it has collected the residue without breaking the gas seal of the sealed container 7, there is provided an inert gas lock 19 which includes a suitable intermediate sealing member 20 positioned between the rigid lock 19 and the collector 18. The sealing arrangement is of the conventional type and its exact construction forms no part of the present invention. The collector assembly 18 includes an inner cylindrical receptacle 21 of quartz, tantalum, or other high-temperature resistant material. The residue collector assembly 18 further includes a pair of cooperating hollow semicylindrical chambers 22 and 23 which surround the inner cylinder 21 and may be moved laterally away from each other to effect removal of the inner cylinder containing the residue. To effect the solidification of the residue as it falls under gravitational force from aperture opening 1a to the bottom of container 21, the hollow semicylindrical elements 22 and 23 are cooled by means of a suitable coolant such as water which may enter through coolant inlet conduits 24 and 25 and exit through outlet conduits 26 and 27. The collector is continually flushed with an inert gas which enters through inlet 28 and exits through outlet 29.

The operation of the apparatus which makes use of the novel method for recovery and reusing the quartz crucibles normally lost in a silicon crystal producing operation is as follows:

After the ingot of silicon is melted in the crucible 1 and a single crystal of the material is formed by the conventional pulling operation, the outlet valve 10 which controls the gas pressure within the sealed container 7 is regulated so as to increase the pressure above the surface of the residue remaining within the crucible to a value sufficient to overcome the surface tension of the residue with respect to aperture 1a. A gas pressure of 2 to 3 inches of mercury (Hg) was found to be sufficient to produce the desired results. The residue melt which is forced through the aperture 1a by the increased gas pressure within sealed container 7 falls vertically past the coolant within the hollow base member 15, past the inert gas lock 19 and enters a collector cylinder 21. The silicon is further cooled and solidified as it enters the collector cylinder 21 which is in direct contact with the two semicylindrical coolant chambers 22 and 23. The silicon may be cooled to solidify so quickly that it will not adhere or bond to the sides of the collector. After the residue within the crucible or container 1 has been exhausted, the contents of the collector cylinder 21 may be removed without breaking the seal of container 7 by means of inert gas lock 19, or the crystal pulling process may be repeated until the residue collector 21 is filled.

While the particular apparatus using the present invention includes coolant chambers for cooling the liquid residue as it drops by gravity into a suitable container, such cooling may be effected by allowing the residue to drop directly into a suitable liquid coolant bath which may be placed within the collector cylinder itself.

During the operation wherein a pressure difference is produced across the aperture formed within a quartz crucible with the subsequent removal of the molten silicon from the crucible, the resultant product within the collector 21 may be produced either in the form of a densified rod or a plurality of individual silicon pellets. The end product will be in the form of pellets if the individual droplets of liquid silicon which are emitted from the aperture 1a are frozen while the droplets are falling within the collector prior to their striking the bottom of the collector. However, if the solidification of the molten droplets is slowed down to an extent where they do not solidify until after they strike the bottom of the collector, there will be produced a single densified rod of silicon material. Assuming that the operation occurs after the complete mass within the quartz container has been melted and the molten mass is quite homogeneous, each of the droplets being emitted from the aperture 1a will also be homogeneous. However, in the case of the formation of pellets, there will be a small amount of segregation occurring within each individual pellet because one portion of the pellet will have solidified prior to another portion of the pellet. This will result in silicon pellets which are substantially uniform in impurity content pellet to pellet, since any impurity segregation occurs only within an individual pellet.

If the molten droplets are allowed to fall freely within the collector 21 until they contact the bottom, they will form a densified rod made up of a great number of very minute layers formed by each individual droplet as it strikes the preceding layer. Since the layers are of minute thickness, and since the mass is spread over such a relatively large area, there will be almost instantaneous solidification of each individual molten mass as it strikes the bottom of the container 21. Because of the minute thickness of each individual layer, there will be substantially no segregation occurring. Therefore, in the case of a densified rod which is formed within the collector 21, the rod will be completely homogeneous throughout its length and will be essentially the same as that of the molten mass originally present within the quartz crucible prior to the "blowing" operation.

The molten silicon can also be forced through the aperture 1a into the collector 21 as an unbroken stream which is quickly cooled to minimize segregation.

It is particularly important that the whole of the ingot within the quartz container be melted prior to the blowing operation, otherwise, there will not be a homogeneity that is necessarily required to produce a final silicon product having the desired characteristics. The particular process of including a number of crystal pulling operations to effect the production of silicon masses which include varying amounts of impurities, may be effectively employed by use of the apparatus shown in FIG. 1. A sample operation is as follows: The crucible 1 is loaded with a six-pound ingot of high purity silicon, the ingot being a product from a chemical operation. The ingot is then melted by applying a high-frequency current to the heating coil 11 and after the ingot is totally melted and the mass is homogeneous, a seed crystal 4 is lowered by means of the rod 6 and a four-pound single or polycrystal may be drawn under a suitable atmosphere such as inert gas or a wet-hydrogen atmosphere in the same manner indicated above. After the four-pound crystal is withdrawn, and because of the normal segregation of impurities which occurs during such a process, the remaining two-pound mass within the crucible effectively contains the major amount of impurities from the original six-pound mass. The next step in the operation is to "blow" the remaining two pounds through the aperture 1a and to form either a plurality of silicon pellets or a densified rod in the manner noted previously. This will leave the quartz crucible 1 free of any impurities or any residue silicon, and if any etching of the silicon by the mass and the subsequent removal of any boron within the crucible has taken place it will be removed by the two-pound mass which was blown through aperture 1a. Also, if the crystal is grown under a wet-hydrogen atmosphere a substantial amount of boron will be removed. The next step is placement of the four-pound crystal back in the quartz crucible 1 to be remelted by the induction coil 11. Upon remelting of the four-pound mass, the crystal pulling operation was repeated to form a second crystal having a mass of approximately two pounds. In the formation of the second crystal having a two-pound mass, segregtaion again occurs and the majority of any remaining impurities will be concentrated within the two-pound liquid silicon mass remaining within the quartz container or crucible while the second two-pound crystal will be relatively free of impurity. Again, the two-pound crystal is removed and the atmosphere above the remaining two-pound molten mass is increased so as to blow the remaining molten mass through aperture 1a into the collector 21. The mass flowing through aperture 1a may be quickly solidified while in droplet form to form suitable pellets, or alternatively may be more slowly cooled within the container to effect production of a densified rod of silicon. The remaining two-pound crystal which contains a minimum amount of impurities may be removed from the system or melted back in the quartz crucible under the wet-hydrogen atmosphere and blown into the collector to form a densified rod or pellets as desired.

Referring now to FIG. 2, there is shown an apparatus of the zone refining type for the purification of a silicon mass. The apparatus is shown in a horizontal position but is rotated 90° subsequent to the zone refining to effect the operation of the particular features of the present invention. While in the horizontal position, the quartz crucible 101 is filled with a suitable silicon semiconductive mass 102 to an appropriate level, the quartz crucible being supported by the somewhat cylindrical graphite shell 103. In order to keep the silicon at a temperature high enough to prevent breakage, there is provided a heater such as an induction coil 104 which surrounds the graphite support means 103 and the quartz crucible 102 so as to effect a substantially uniform heating of the silicon mass. As in the conventional zone refining apparatus, there is provided a portion 105 of the induction coil 104 having turns which are closely spaced with respect to each other rather than loosely spaced as in the major portion of the heating coil 104. The close spacing of a portion of the heating coil effects localized heating at this portion of the crucible so as to melt only a portion 102A of the silicon mass. While only a single induction coil having some rather closely spaced turns to effect a localized heating is shown, any conventional method may be employed to effect the zone refining necessary. A high frequency generator, not shown, is utilized to pass a current through the induction coil 104 in order to heat the quartz container. The zone refining operation occurs within a closed housing 106. The closed housing 106 is flushed by passing a gas therethrough which may be wet-hydrogen gas, inert gas, wet inert gas or other material. In addition to having the inert gas within the closed housing, means are provided such as inlet conduit 107 for introducing some of the inert gas within the quartz crucible. Thus, the horizontal zone refining takes place within the same inert gas atmosphere as that which is passing through the closed housing. A suitable outlet conduit 108 is also provided for removing the inert gas entering through inlet conduit 107.

In the zone refining operation, provision is made for moving the crucible 101 with respect to the induction coil 104. The particular method for achieving this relative movement forms no part of the present invention and any conventional means may be employed. In the embodiment shown in FIG. 2, the crucible 101 is moved relative to the stationary induction coil 104 so that the localized melting zone 102A may be advanced through the silicon mass from the end remote from an aperture 110 towards the apertured end. As the molten zone is advanced, there is a tendency for the impurities to remain within the liquid portion. In this manner, the impurities tend to move from the right end of the silicon mass towards the left end as viewed in FIG. 2. This particular technique of achieving purification results in a final product within the crucible having a major portion of the mass of high purity and a small portion near the end adjacent the apertured portion of the quartz container which is relatively impure.

Following the purification of the mass by zone refining, the present invention is employed to effect removal of the silicon from the quartz crucible. In order to accomplish this, the closed housing 106 is rotated 90° from a horizontal to a vertical position with aperture 110 down. In this position, additional elements of the apparatus are used to effect the collection of the silicon mass as it is removed from the quartz container in a manner quite similar to that employed in the apparatus of FIG. 1. Disposed at one end of the closed housing 106 is a water-cooled collector 109 which is cup-shaped and is adapted to be positioned axially below the aperture 110 formed within the quartz crucible 101. The collector cup 109 is similar to the collector of FIG. 1 and is made of quartz, tantalum or other high temperature resistant material. The quartz collector cup 109 is positioned within a support 111 which completely surrounds the outside of the container so as to provide a hollow section between the inside of the container and the quartz collector cup. A suitable cooling fluid 112 such as water may enter the hollow section by means of an inlet conduit 113 and exhaust by means of the outlet conduit 114 to effect cooling of the silicon. In order to effect removal of the collector cup 109 at any time during the operating of the device, there is provided a conventional gas lock sealing arrangement indicated at 115 which effectively divides the closed housing 106 into two portions.

After the closed housing 106 and the rest of the apparatus has been rotated 90° from a horizontal to a vertical position, the quartz container is moved with respect to the induction coil so that a portion of the semiconductive mass 102 which lies adjacent the aperture 110 is reheated until it is completely molten. The present invention also envisions an arrangement wherein the zone refining is carried on so that as the molten zone 102A advances from the end of the crucible remote from the aperture towards that containing the aperture 110, the final portion of the silicon mass to be heated will be that adjacent the aperture and there will be no need for reheating this portion prior to use of the present improved method for removing the semiconductive mass from the quartz container and the resultant saving of the crucible. In either case, after the portion adjacent the aperture is melted, the gas pressure within the quartz container 101 is increased by means of the gas inlet conduit 107 so that the normal surface tension existing between the molten mass 102A and the aperture formed within the end of the quartz container is overcome so that the molten part of silicon mass will be forced through the aperture 110 and will drop into the water-cooled quartz collector cup 109. After this portion of the molten silicon semiconductive material has been exhausted through the aperture, the gas pressure is reduced, and the crucible and its support means are moved again relative to the induction coil so that the next adjacent portion of the semiconductive mass may be melted in a like manner and this portion may be removed through the aperture by increasing the pressure above the surface of the molten second portion. This process is repeated until all of the silicon has been removed from the crucible in the manner similar to the complete removal of silicon in the apparatus of FIG. 1. During this removal of the silicon mass which has been refined by the zone refining process described, the end product which has been collected by the collector 109 may be removed by either the formation of silicon pellets within the container or by a densified rod in the manner employed by the embodiment shown in FIG. 1. While we have shown an apparatus forming a collector which is somewhat different from that shown in FIG. 1, the particular structure shown is only illustrative of one type of water-cooled collector that may be employed and the process as adapted to horizontal zone refining is by no means limited to a collector of this type.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The method of preventing the destruction of a quartz container used in melting silicon in which some of said silicon normally adheres to the container after resolidification causing destruction of said container, said method comprising, melting a mass of silicon within a quartz container having an aperture therein at a point normally below the surface of said molten silicon, said aperture being of sufficiently small size to prevent discharge of molten silicon therethrough by gravitation, removing a portion of said mass of silicon from said container by lowering a seed crystal to contact the uppermost portion of said molten silicon and then pulling said seed crystal from said molten silicon at a predetermined speed and rotation with some of said molten silicon attaching to said seed crystal to produce a single crystal of silicon by removing a predetermined amount of said molten silicon from said quartz container and then applying a pressure above the surface of the remaining molten silicon to overcome the normal surface tension existing between said remaining molten silicon and the portion of the container surrounding said aperture for a predetermined period of time until all of said remaining molten silicon has been removed from said container through said aperture, whereby said quartz container is rendered reuseable after cooling.

2. An improved method of zone refining to produce a silicon mass which is homogeneous and of high purity, including the steps of placing a mass of silicon within a horizontally positioned quartz crucible having an aperture which is sufficiently small to prevent molten silicon being discharged therethrough by gravitation at the bottom thereof when translated to a vertical position, establishing in said silicon mass a molten zone containing impurities, causing said molten zone to travel along substantially all of said silicon mass from the end of said quartz container remote from said aperture toward said apertured end, whereby impurities in said silicon mass remain in said molten zone, translating said quartz container and said silicon mass therein from a horizontal to a vertical position when said molten silicon mass is adjacent said apertured end of said quartz container, whereby said aperture is now positioned at the bottom of said silicon mass, and creating a pressure differential between the upper surface of said molten portion of said silicon mass and said aperture to overcome the normal surface tension between said molten mass and the portion of the container surrounding said aperture, whereby said molten mass including said impurities is evacuated through said aperture.

References Cited in the file of this patent

UNITED STATES PATENTS

| | | |
|---|---|---|
| 2,712,621 | North | July 5, 1955 |
| 2,768,074 | Stauffer | Oct. 23, 1956 |
| 2,768,914 | Buehler | Oct. 30, 1956 |
| 2,889,240 | Rosi | June 2, 1959 |
| 2,935,386 | Selker | May 3, 1960 |

FOREIGN PATENTS

| | | |
|---|---|---|
| 774,270 | Great Britain | May 8, 1957 |
| 330,205 | Switzerland | July 15, 1958 |